US008233541B2

(12) United States Patent
Liu (10) Patent No.: US 8,233,541 B2
(45) Date of Patent: Jul. 31, 2012

(54) RECURSIVE IMAGE QUALITY ENHANCEMENT ON SUPER RESOLUTION VIDEO

(75) Inventor: Ming-Chang Liu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1162 days.

(21) Appl. No.: 12/056,119

(22) Filed: Mar. 26, 2008

(65) Prior Publication Data

US 2009/0245375 A1 Oct. 1, 2009

(51) Int. Cl.
*H03K 11/00* (2006.01)
*H04L 25/60* (2006.01)
*H04L 25/00* (2006.01)

(52) U.S. Cl. ......... 375/240.16; 375/240.12; 375/240.17; 375/240.2; 375/240.15; 348/699; 348/416; 348/443; 348/402; 348/222.1

(58) Field of Classification Search ............. 375/240.16, 375/240.12, 240.17, 240.11, 240.15, 240.18; 348/699, 416, 443, 402, 222.1
See application file for complete search history.

(56) References Cited

U.S. PATENT DOCUMENTS

| | | | |
|---|---|---|---|
| 5,535,291 A | | 7/1996 | Spencer et al. |
| 6,205,176 B1* | | 3/2001 | Sugiyama ................. 375/240.12 |
| 6,580,812 B1* | | 6/2003 | Harrington ................... 382/107 |
| 7,119,837 B2 | | 10/2006 | Soupliotis et al. |
| 2004/0156561 A1 | | 8/2004 | Yu-Chuan et al. |
| 2005/0019000 A1 | | 1/2005 | Lim et al. |
| 2006/0290711 A1 | | 12/2006 | Milanfar et al. |
| 2007/0103595 A1 | | 5/2007 | Gong et al. |
| 2007/0133680 A1* | | 6/2007 | Kimoto ..................... 375/240.12 |
| 2008/0316327 A1* | | 12/2008 | Steinberg et al. .......... 348/222.1 |
| 2009/0232213 A1* | | 9/2009 | Jia ............................ 375/240.16 |

FOREIGN PATENT DOCUMENTS

WO 2007089803 A2 8/2007

OTHER PUBLICATIONS

W.Y. Zhao. "Super-Resolving Compressed Video with Large Artifacts", Proceedings of the 17th International Conference on Pattern Recognition (ICPR '04), Aug. 23-26 2004, pp. 516-519, vol. 1.
A.J. Patti et al., "Artifact reduction for set theoretic super resolution image reconstruction with edge adaptive constraints and higher-order interpolants", IEEE Transactions on Image Processing, Jan. 2001, vol. 10 Issue 1, pp. 179-186.

(Continued)

*Primary Examiner* — Andrew Chriss
*Assistant Examiner* — Jamal Javaid
(74) *Attorney, Agent, or Firm* — John P. O'Banion (57) ABSTRACT

Method and apparatus for improving the quality of super-resolution video imaging by suppressing ringing artifacts, reducing high-frequency noise, reducing blocking artifacts, and smoothing out jagged edges of the image to generate pictures that appear cleaner with less edge degradation. The method operates in a recursive manner within a sequence of low resolution images. Conventional SR processing is primarily enhanced within the invention by adding an artifact suppression section which creates a high frequency component signal $\Delta SR_i$ having significantly reduced artifacts therein achieving higher quality super-resolution image output. The method can be applied to images and image sequences (video) in monochrome or color and in any desired pixel format. The method can be implemented within image processing devices, in particular those containing programming for executing the described method steps.

20 Claims, 6 Drawing Sheets

OTHER PUBLICATIONS

J. Yu et al., "A method of Gibbs artifact reduction for POCS super-resolution image reconstruction", IEEE the 8th International Conference on Signal Processing, Dec. 20, 2006, vol/issue 2.

J. Tian et al., "Markov Chain Monte Carlo Super-resolution Image Reconstruction With Artifacts Suppression", IEEE Asia Pacific Conference on Circuits and Systems, Dec. 4, 2006, pp. 940-943.

G.H. Costa et al., "Statistical analysis of the LMS algorithm applied to super-resolution image reconstruction", IEEE Transactions on Signal Processing, May 2007, vol. 55 Issue 5, pp. 2084-2095.

D. Zhang et al., "Hybrid recursive super-resolution image reconstruction using neural networks", Third International Conference on Natural Computation ICNC 2007, Aug. 24, 2007, vol. 1, pp. 192-196.

* cited by examiner

RECURSIVE IMAGE QUALITY ENHANCEMENT ON SUPER RESOLUTION VIDEO

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention generally pertains to super-resolution image processing, and more particularly to suppressing ringing and reducing noise within a super-resolution process without iterative processing.

2. Description of Related Art

Apparatus and methods for simplifying the creation of high-definition (high-resolution) content have become increasingly sought after by the photographic and more particularly video industries. The increased importance of these mechanisms is especially profound in view of recent changes which make high-definition video content the standard for video streams.

Conventional mechanisms for generating high-resolution content require the use of imaging systems that have a pixel resolution equivalent to the desired resolution of the output video. It will be recognized that although this produces a desirable video output stream with a minimum of artifacts, it represents a high-cost solution which is not suitable for all applications.

In addition, a large body of content exists which was captured in standard definition or lower resolution, from which it is often desirable to generate high-definition or higher resolution video from these existing content sources to improve the viewing experience.

Recently, work has been put forth toward combining multiple lower-resolution images into frames of a higher-resolution image stream or video utilizing super-resolution techniques. These techniques have shown promise, yet are subject to a number of shortcomings. In creating the higher-definition images, noise in the form of high frequency artifacts, are often introduced into the video, while ringing artifacts often appear which magnify the noise problems. In addition, existing super-resolution techniques require iterative processing to achieve reasonable picture quality. However, such processing is not practical for use in real-time applications or super-resolution video generation.

Accordingly, a method is needed for balancing image sharpness and noise/ringing artifacts for real-time applications when generating super-resolution images and video (movies) with embedded video quality enhancement. The present invention fulfills that need, as well as others, and overcomes deficiencies of previously proposed solutions.

BRIEF SUMMARY OF THE INVENTION

The method and apparatus of the invention is directed at enhancing the quality of super-resolution video by suppressing ringing artifacts, reducing high-frequency noise, reducing blocking artifacts, and smoothing out the jagged edges of images. Toward fulfilling these objectives the inventive method and apparatus executes mechanisms for smoothing out the high-frequency feedback through a temporal plane, and adaptively applying weighted averaging on current image feedback and smoothed motion compensated feedback.

It should be recognized that conventional super-resolution approaches improve picture quality by blending a number of images captured with the same scene to estimate missing high frequency components and add them back to the target image. This process needs to be iteratively performed until the feedback converges to a pre-set criterion to achieve a desired quality level. Whereas conventional techniques involve iteratively improving picture quality of a single image by utilizing many images, the real-time applications of the present invention utilize multiple (e.g., two or more) temporally displaced images, preferably sequential frames, for each process and the estimated high-frequency components are updated for quality improvement through time.

The method of the present invention can be executed by various still, and more particularly, video image processing systems. The method is preferably implemented within an apparatus, for example one containing a computer, such as configured for executing the method in response to programming executable on the computer for performing the method steps. In addition, it will be appreciated that the method can be implemented as a media containing programming executable on a computer.

The following terms are generally described in relation to the specification, but not toward constraining that which is recited in the specification.

The invention can be applied to sequences of still images, or to video sequences (e.g., video or movies), wherein the terms "video" and "movie" are used synonymously. The invention can be equally applied to either color or monochrome imaging of any desired format. In addition, the term "image", "frame" and "picture" are also utilized synonymously.

The term "iterative" as applied to conventional super-resolution techniques refers to solving a problem, or otherwise finding a suitable solution, in response to making successive approximations starting from an initial 'guess'. Iterative processing is in contrast to direct methods, which attempt to solve the problem in a single pass, or from a single computation.

The term "recursive" as utilized with respect to the present invention, and as it is known in mathematics and computer science, is a method of solving a problem through an operation in which the operation being defined is applied within its own definition, for example utilizing data from prior or future time periods (e.g., images or frames).

The term "resolution" as applied to images typically refers to spatial resolution, whereby if the text herein does not specify "temporal resolution" or "spatial resolution", then it can be considered to refer to spatial resolution in the most common context of the word "resolution". It will be noted that the term "high-resolution" and "high-definition" are both directed at spatial resolution aspects. One of ordinary skill in the art will recognize that spatial resolutions are generally stated as a number of vertical and horizontal rows of pixels (e.g., 800×600, 1024×768, 1280×720, 1920×1080 and so forth), or as a number of pixels in the frame. Furthermore, those skilled in this area of art will recognize that temporal resolution regards the image rate, or period between images, such as given by the number of frames per second within the image stream.

The term "super-resolution" (SR) is utilized herein to describe a process for processing images of a first resolution to achieve images at a higher, second, resolution. Thus, the term "super-resolution" as used herein, does not denote a particular level of spatial resolution, such as being above "high-resolution", but a process toward increasing resolution. One of ordinary skill in the art will appreciate that super-resolution (SR) techniques can be applied to images of any spatial resolution toward increasing spatial resolution.

The invention is amenable to being embodied in a number of ways, including but not limited to the following descriptions.

One embodiment of the invention is a method of generating super-resolution imaging, comprising: (a) estimating motion $MV_{i+1}$ for a super-resolution image $SR_i$ as a reference and a low-resolution image $LR_{i+1}$ at a current temporal position within a series of images i=0, 1, ... N; (b) generating a motion compensated image on the super-resolution image $SR_i$ and constructing an initial super-resolution image initial $SR_{i+1}$; (c) generating a control parameter (Beta) $\beta$ in response to motion compensation of an initial $SR_i$ input in response to input of a low-resolution image $LR_i$ to create recursive high-frequency component feedback; (d) generating a control parameter (alpha) $\alpha$ in response to interpretation of previous estimated high-frequency components $\Delta SR_{i-1}$ and motion estimation $MV_i$; (e) adaptively adjusting the $\alpha$ value in response to motion accuracy; and (f) summing signal $\alpha$ and signal $\beta$ to output an estimated high-frequency components $\Delta SR_i$. Utilization of this method enhances the quality of super-resolution video by suppressing ringing artifacts, reducing high-frequency noise, reducing blocking artifacts, and smoothing out the jagged edges of images.

In at least one implementation of the invention, the super-resolution image of initial $SR_{i+1}$ is constructed comprising: (a) generating a motion mask $mask_{i+1}$ in response to comparing the motion-compensated image $SR_i$ and up-scaled version of image $LR_{i-1}$; (b) the motion mask indicates reliability of each pixel within motion-compensated image $SR_i$; and (c) selecting, in response to motion mask $mask_{i+1}$, either pixels of motion-compensated image $SR_i$, pixels of the up-scaled version of image $LR_{i+1}$, or the combination of motion-compensated image $SR_i$ and pixels of the up-scaled version of image $LR_{i+1}$, to construct an initial super-resolution picture $SR_{i+1}$.

In at least one implementation of the invention, generation of control parameter $\beta$ additionally comprises: (a) generating feedback in response to comparing low-resolution image $LR_i$ with Initial $SR_i$; (b) extracting high frequencies from the feedback and in response to two-dimensional (2D) priori filtering of Initial $SR_i$ to generate an intermediate control parameter $\beta$ signal; and (c) masking of the output of the intermediate control parameter $\beta$ signal based on input $mask_i$ to generate the control parameter $\beta$.

In at least one implementation of the invention the generation of control parameter $\alpha$ additionally comprises masking of the output of the motion compensation based on input $mask_i$.

In at least one implementation of the invention adaptive adjustment of the $\alpha$ value is performed in response to motion accuracy and comprises the steps: (a) constraining the value of $\alpha$ between $0 \leq \alpha < 1$; (b) selecting a first $\alpha$ value which for areas with accurate motion information, toward achieving improved ringing and noise suppression; (c) selecting a second $\alpha$ value, lower than the first $\alpha$ value, for areas having less accurate motion information, to hold the output closer to the original toward suppressing artifacts; and (d) setting $\alpha$ value towards zero for areas having suspicious or no motion information, to reduce the introduction of artifacts. In at least one preferred embodiment the first value (high) of $\alpha$ is $\alpha \approx 0.75$, while the second value (low) of $\alpha$ is $\alpha \approx 0.25$. It will be appreciated, however, that these values can be varied through respective high and low ranges depending on the specific application without departing from the teachings of the present invention.

One embodiment of the invention is an apparatus for generating super-resolution imaging, comprising: (a) a computer configured for processing sequences of images; and (b) programming executable on the computer for, (b)(i) estimating motion $MV_{i+1}$ for a super-resolution image $SR_i$ as a reference and a low-resolution image $LR_{i-1}$ at a current temporal position within a series of images i=0, 1, ... N, (b)(ii) generating a motion compensated image on the super-resolution image $SR_i$ and constructing an initial super-resolution image initial $SR_{i-1}$, (b)(iii) generating a control parameter $\beta$ in response to motion compensation of an Initial $SR_i$ input in response to input of a low-resolution image $LR_i$ to create recursive high-frequency component feedback, (b)(iv) generating a control parameter $\alpha$ in response to interpretation of previous estimated high-frequency components $\Delta SR_{i-1}$ and motion estimation $MV_i$, (b)(v) adaptively adjusting the $\alpha$ value in response to motion accuracy, and (b)(vi) summing signal $\alpha$ and signal $\beta$ to output an estimated high-frequency components $\Delta SR_i$.

One embodiment of the invention is a computer-readable media containing a computer program executable on a computer configured for processing video images and causing the computer to generate a shutter-time compensated high spatial resolution video image output, in response to steps, comprising: (a) estimating motion $MV_{i+1}$ for a super-resolution image $SR_i$ as a reference and a low-resolution image $LR_{i+1}$ at a current temporal position within a series of images i=0, 1, ... N; (b) generating a motion compensated image on the super-resolution image $SR_i$ and constructing an initial super-resolution image initial $SR_{i+1}$; (c) generating a control parameter $\beta$ in response to motion compensation of an Initial $SR_i$ input in response to input of a low-resolution image $LR_i$ to create recursive high-frequency component feedback; (d) generating a control parameter $\alpha$ in response to interpretation of previous estimated high-frequency components $\Delta SR_{i-1}$ and motion estimation $MV_i$; (e) adaptively adjusting the $\alpha$ value in response to motion accuracy; and (f) summing controls signals $\alpha$ and $\beta$ to output estimated high-frequency components $\Delta SR_i$.

The present invention provides a number of beneficial aspects which can be implemented either separately or in any desired combination without departing from the present teachings.

An aspect of the invention provides improved image output from improved super-resolution (SR) processing.

Another aspect of the invention is that of suppressing ringing artifacts in response to improved SR image processing.

Another aspect of the invention is that of reducing high-frequency noise in response to improved SR image processing.

Another aspect of the invention is that of reducing blocking artifacts within improved SR image processing.

Another aspect of the invention is that of reducing the appearance of jagged edges on image subjects of improved SR processing.

Another aspect of the invention is that of incorporating an artifact suppression section coupled to the high frequency content generation section and controlling the artifact suppression section from inputs received intermediate the super-resolution construction section.

Another aspect of the invention is an artifact suppression section that generates an $\alpha$ control value to be blended with a $\beta$ control value as received from the high frequency content generation section, toward outputting $\Delta SR_i$.

Another aspect of the invention is performing an improved SR method in which artifacts of high-frequency feedback is smoothed out.

Another aspect of the invention is performing an improved SR method in which adaptively weighted averaging is applied on current image feedback and smoothed motion compensation.

Another aspect of the invention is its broad applicability to the generation of increased resolution video frames within cameras, video cameras, image processing software, medical imaging, and so forth.

A still further aspect of the invention is the ability to implement the approach as an apparatus, method, programming executing on a computer, or as media containing programming executable on a computer.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1, FIG. 3A-3C, FIG. 5A-5B, FIG. 7A-7B and FIG. 8. It will be appreciated that the apparatus may vary as to configuration and as to details of the parts, and that the method may vary as to the specific steps and sequence, without departing from the basic concepts as disclosed herein.

The inventive apparatus and method generates higher resolution video frames with fewer artifacts and ringing than provided by conventional super-resolution techniques. The invention is preferably implemented as programming executable on a computer, or at least one computer-processing element, configured for processing video streams and executing video algorithms. The invention can also be embodied as an apparatus, or as a media containing programming executable on a computer, and so forth and combinations thereof.

Figure 1:
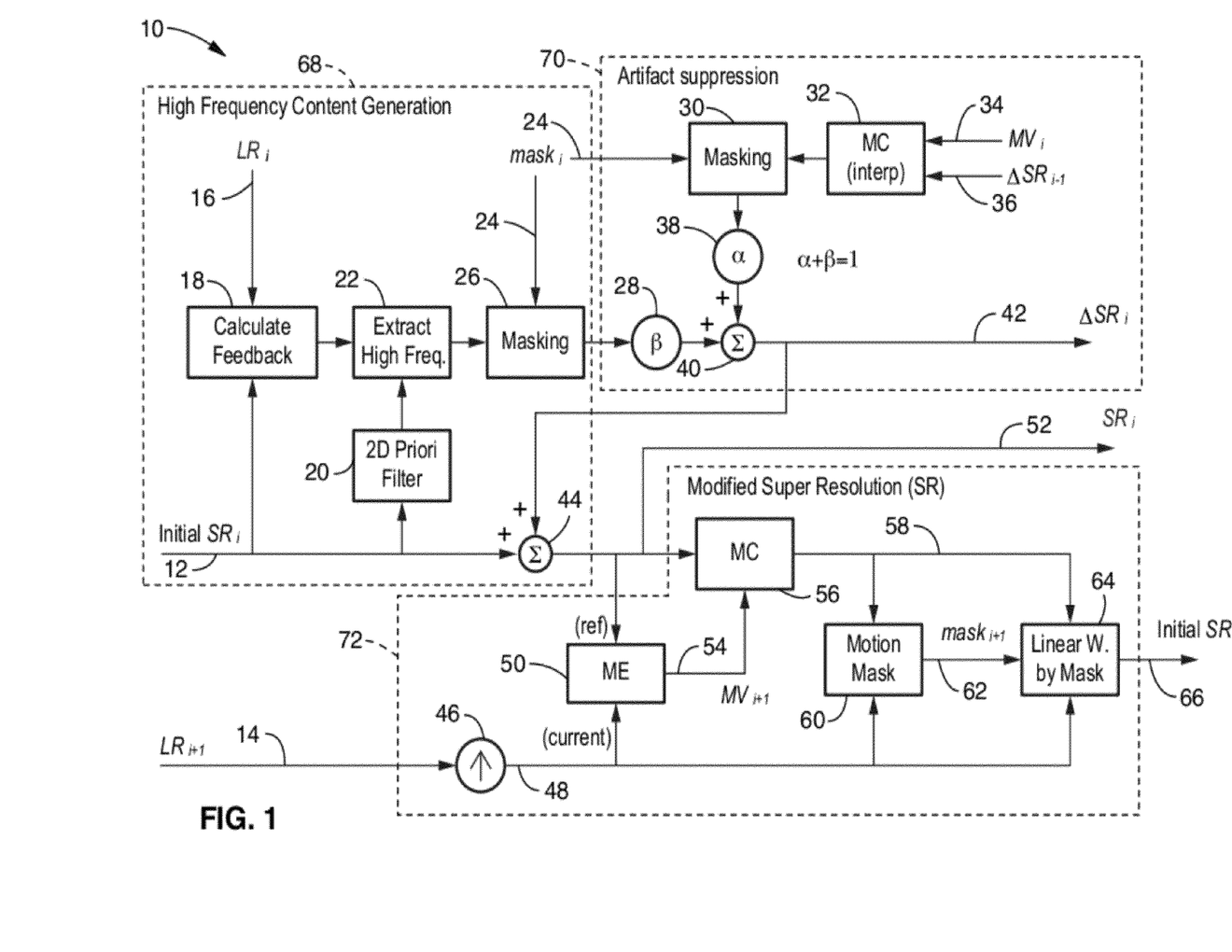
FIG. 1 is a schematic of a recursive SR apparatus and/or method according to an embodiment of the present invention.

FIG. 1 illustrates an example of a super-resolution embodiment 10, which is shown generally comprising a high-frequency content generation section 68, an artifact suppression section 70, and an SR construction section 72. It should be appreciated, however, that these sections are designated by way of example, and not limitation, to aid in explanation. One of ordinary skill in the art will recognize that the names and functional boundaries may be altered without departing from the teachings of the present invention.

It should be appreciated that a conventional SR process does not include artifact suppression section 70, wherein the output of the high-frequency content generation section 68 is summed, or blended, at block 44. The artifact suppression section 70 is configured in the present invention to provide for smoothing-out the high-frequency feedback and applying the weighted averaging.

In an alternative to the implementation of high frequency content generation as shown in section 68, the down-sampling of initial SR can be avoided and then the difference up-sampled, thereby departing from conventional methodology.

Signal initial $SR_i$ 12 is an initial super-resolution image at time i, which is generated in section 72 at time i−1. That is, initial $SR_{i+1}$ 66 will become initial $SR_i$ 12 when the process moves to the subsequent frame. The first initial $SR_i$ at i=0, can be obtained by interpolation as a starting point. Signal $LR_{i+1}$ 14 is a low-resolution image for time i+1 which is shown being received by the initial SR construction section 72. In general, an initial SR picture (initial $SR_i$ 12) is first constructed and then the estimated high-frequency components ($\Delta SR_i$ 42) are added to create an SR picture ($SR_i$ 52). At time i, the super-resolution picture $SR_i$ 52 is used as a reference frame for motion estimation (ME) on current image 48, which is an interpolation picture of a low-resolution image $LR_{i+1}$ 14 at time i+1. Block 46 performs up-scaling of the low-resolution image to match the high spatial resolution image, with associated loss of detail. The motion estimator 50 estimates the motion vector ($MV_{i+1}$ 54) between the reference picture and current picture. The super-resolution picture $SR_i$ 52 is then motion compensated by motion compensation (MC) block 56 based on motion vector ($MV_{i+1}$ 54) to create a motion-compensated image 58.

By comparing motion-compensated image 58 and up-scaled image 48, block motion mask 60 creates a motion mask $mask_{i+1}$ 62, which is a map of reliability indicating the reliability of each pixel in the motion-compensated image 58. Based on $mask_{i+1}$ 62, either pixels of motion-compensated image 58, pixels of up-scaled image 48, or their combination, are used by block 64 to construct an initial super-resolution picture initial $SR_{i+1}$ 66. Preferably the combination comprises a linear combination, though variations can be utilized without departing from the invention.

This initial $SR_{i+1}$ 66 becomes the initial SR picture (initial $SR_i$ 12) at time i+1. The first initial SR picture (at i=0) can be created just by interpolation. The motion mask $mask_{i+1}$ 62 becomes the input 24 for masking blocks 26 and 30 at time i+1.

At time i, initial $SR_i$ 12 is compared with original low-resolution picture $LR_i$ 16. In block 18, initial $SR_i$ 12 is down-sampled to simulate the optical low pass filtering for the low-resolution capture and then the difference from observed $LR_i$ 16 is calculated. This difference is further up-sampled to have the same resolution as initial $SR_i$ in block 18 before passing through block 22. Alternatively, one can calculate the difference between Initial $SR_i$ 12 and up-sample $LR_i$ 16, and then this difference is passed through a low-pass filter to become an input of block 22. Initial $SR_i$ 12 is also filtered by filter 20, such as comprising a 2D priori filter, to become another candidate of high frequency components as the second input of block 22 which extracts high frequency components by combining these two inputs.

The artifact suppression section 70 is a primary aspect of the invention, whose functions are now described. Block 32 provides motion compensation of a first input comprising previous estimated high-frequency components $\Delta SR_{i-1}$ 36, with compensation based on a second input comprising motion information $MV_i$ 34, to create a recursive high-frequency component feedback signal. The motion mask $mask_i$ 24, which indicates how accurate the associated motion information is for each pixel, is utilized in block 26 to determine $\beta$ 28 by masking block 26, and to determine $\alpha$ 38 by masking block 30 with constraints $\alpha+\beta=1$ and $0 \leq \alpha < 1$. The $\alpha$ value is adaptively adjusted based on motion accuracy to achieve best results. The value of $\alpha$ utilized ranges from $0 \leq \alpha < 1$. For areas with accurate motion information, a high $\alpha$ value (e.g., $\alpha=0.75$) should be utilized to reduce ringing and increase noise suppression. For areas having less accurate motion information, a lower $\alpha$ value (e.g., $\alpha=0.25$) should be utilized so that the output remains closer to the original value thereby suppressing artifacts. In cases where little motion information is available, the value of $\alpha$ should be set either very low or to zero toward avoiding the creation of artifacts. Once the value of $\alpha$ is determined, the associated value of $\beta$ will be $1-\alpha$. The estimated high-frequency components $\Delta SR_i$ 42 is then calculated at summation block 40 blending $\alpha$ and $\beta$. The signal $\Delta SR_i$ 42 then provides the recursive feedback for time i+1.

It should be appreciated that the teachings shown in FIG. 1 can be implemented as a method, apparatus, system or media encoded with programming executable on a computer, as well as other means of integrating the process aspects recited herein and combinations thereof.

The super-resolution apparatus and method of the present invention provide a number of significant benefits when generating high-resolution images, such as within a video stream. Utilizing these teachings, ringing artifacts are successfully suppressed and quality is gradually improved over time during the recursive process. A reduction of high-frequency noise is provided and the resultant picture output appears cleaner with less edge degradation. In addition, blocking artifacts from the original compressed video are significantly decreased. Edges which appear jagged when using conventional SR techniques appear smooth in the inventive SR technique. Jagged edges often arise in the initial up-sampling or from the original high-frequency feedback utilized within conventional SR techniques.

Another inventive aspect of the present invention, involves adaptively adjusting the $\alpha$ value (represented by block 38 of FIG. 1), based on the accuracy of motion information toward improving image quality. The value of $\alpha$ utilized ranges from $0 \leq \alpha < 1$. It was found that for areas with accurate motion information a high $\alpha$ value (e.g., $\alpha=0.75$) should be utilized to reduce ringing and increase noise suppression. While it was also found that for areas having less accurate motion information a lower $\alpha$ value (e.g., $\alpha=0.25$) should be utilized so that the output remains closer to the original to suppress artifacts. In cases where little motion information is available, the value of $\alpha$ should be set either very low or to zero toward avoiding the creation of artifacts.

FIG. 2A through FIG. 7B depict results for conventional SR methods in comparison with the SR method of the present invention. These are provided by way of example illustrating the utility and benefits of the invention, although it should be understood that a full appreciation of the image enhancement provided (e.g., in color or monochrome) cannot be adequately obtained within the limitations of the instant application based on viewing these low resolution monochrome images.

Figure 2A:
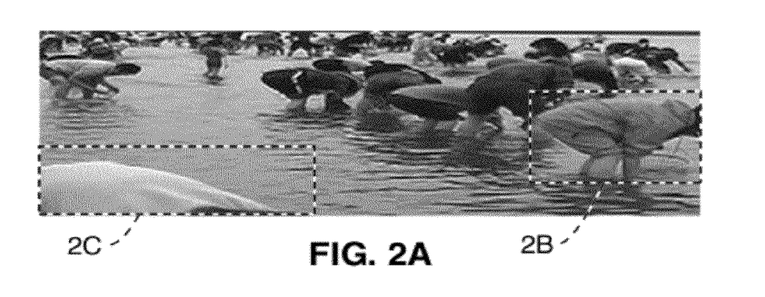
FIG. 2A-2C are high-resolution images created by a conventional super-resolution technique from a low resolution video, showing an image of "clam-diggers" and magnified portions of the FIG. 2A image.
Figure 2B:
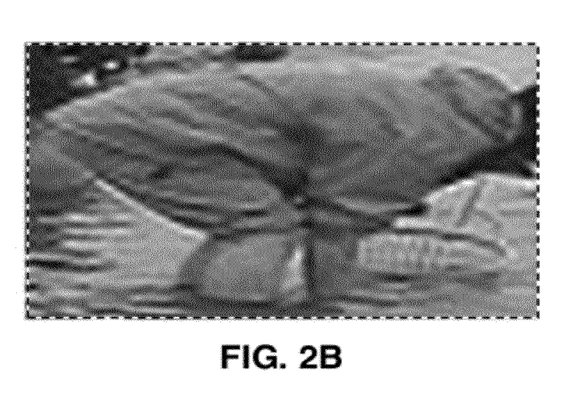
Figure 2C:
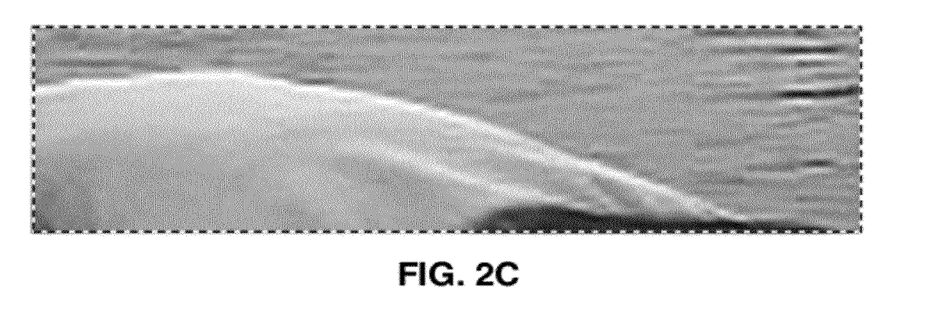
Figure 3A:
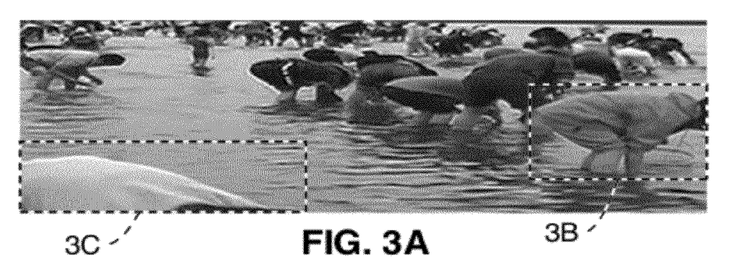
FIG. 3A-3C are high-resolution images created by a super-resolution technique according to an aspect of the present invention, wherein the image was created from the same low-resolution video as used for FIG. 2A-2C.
Figure 3B:
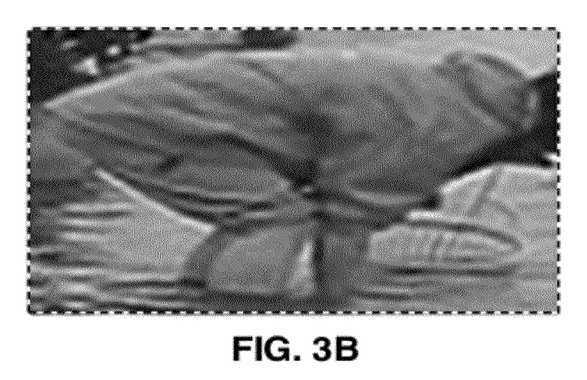
Figure 3C:
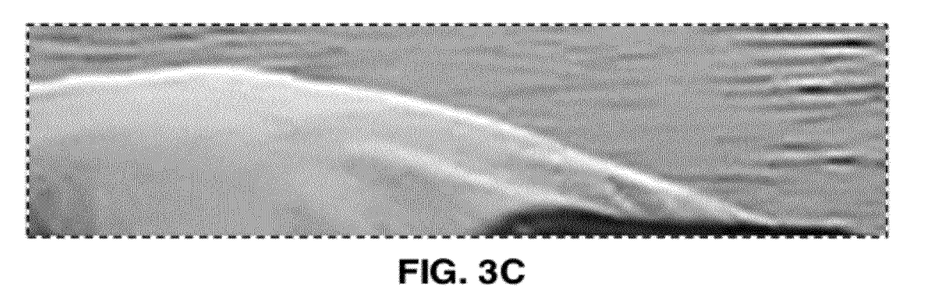

FIG. 2A and FIG. 3A are images (in this case "clam diggers") formed from SR techniques performed on a low resolution source, with FIG. 2A being the result of conventional (original) SR techniques, and FIG. 3A being the result of super-resolution performed according to the present invention. Sections of these images are magnified so that the benefits of the technique are more readily apparent. Comparing the images, and in particular comparing the image section of FIG. 3B with the conventional SR image section of FIG. 2B, and the image section of FIG. 3C with the conventional SR image section of FIG. 2C. The improved SR image of FIG. 3A generated according to the present invention contains far fewer artifacts and noise than found in the conventional SR image of FIG. 2A.

Figure 4A:
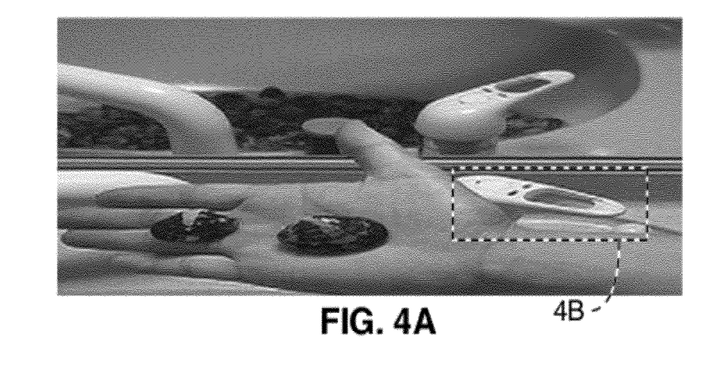
FIG. 4A-4B are high-resolution images created by a conventional super-resolution technique from a low resolution video, showing an image of "two clams held above a sink", portions of the FIG. 4A image are magnified in FIG. 4B.
Figure 4B:
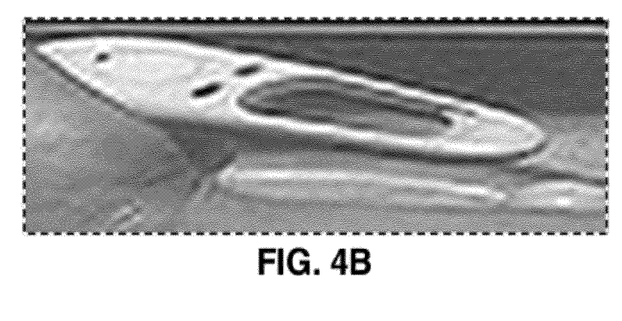
Figure 5A:
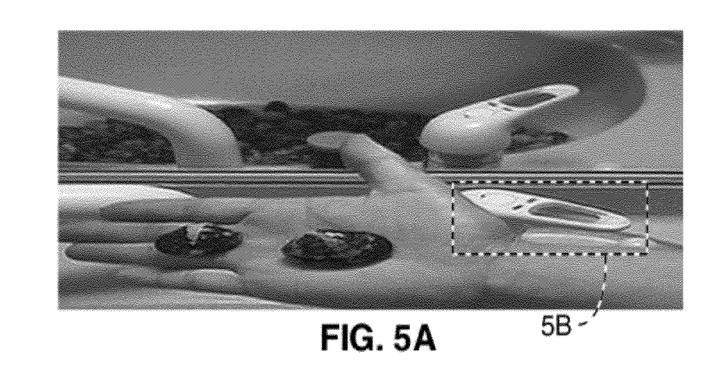
FIG. 5A-5B are high-resolution images created by a super-resolution technique according to an aspect of the present invention, wherein the image was created from the same low-resolution video as used for FIG. 4A-4B.
Figure 5B:
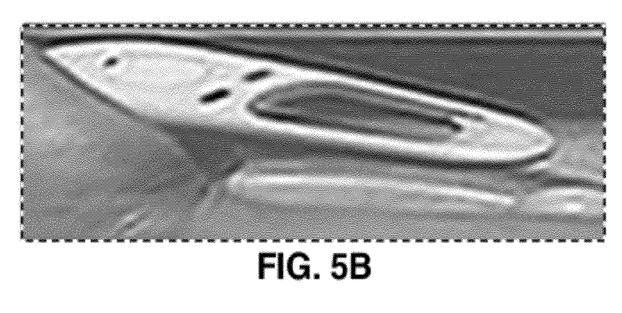

In a similar manner FIG. 4A and FIG. 5A are images (in this case "clams held over sink") formed from the same low resolution video using conventional (original) SR techniques in FIG. 4A, as compared with super-resolution performed according to the present invention shown in FIG. 5A. Sections of these images are magnified wherein one can compare the image segment of FIG. 5B with the conventional SR image segment of FIG. 4B. Comparing these image sections it can be seen that the original images clearly indicate ringing edges and jagged edges as seen on the periphery of the handle. These artifacts are substantially eliminated as seen in the magnified image portion of FIG. 5B. It will be appreciated that although single images are shown, by way of example, the present invention is well suited for use with either still or video images.

Figure 6A:
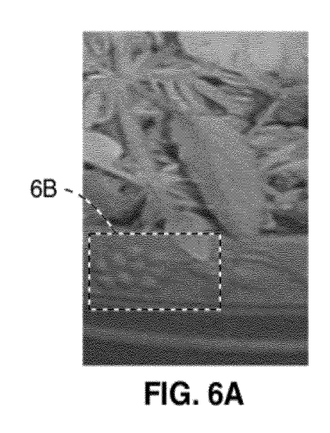
FIG. 6A-6B are high-resolution images created by a conventional super-resolution technique from a low resolution video, showing an image of a "ornate ceramic vase portion" and part of this image is magnified in FIG. 6B.
Figure 6B:
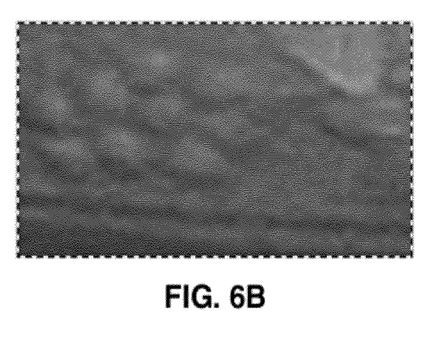
Figure 7A:
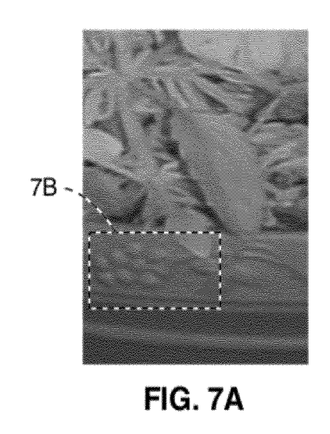
FIG. 7A-7B are high-resolution images created by a super-resolution technique according to an aspect of the present invention, wherein the image was created from the same low-resolution video as used for FIG. 6A-6B.
Figure 7B:
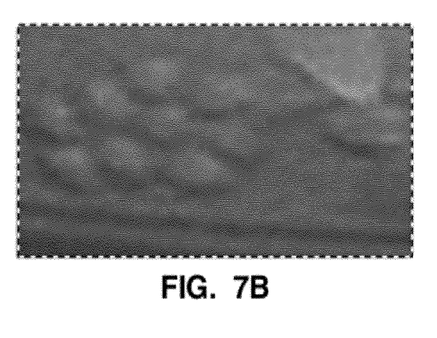

Also in a similar manner FIG. 6A and FIG. 7A are images (in this case "ornate ceramic vase portion") formed from the same low resolution video with conventional SR used for FIG. 6A in comparison with super-resolution according to the present invention in FIG. 7A. A section of each image is magnified allowing a comparison between FIG. 6B with 7B. In the conventional SR image of FIG. 6B noise and ringing can be easily seen, whereas in the image of FIG. 7B these problems are substantially reduced.

Figure 8:
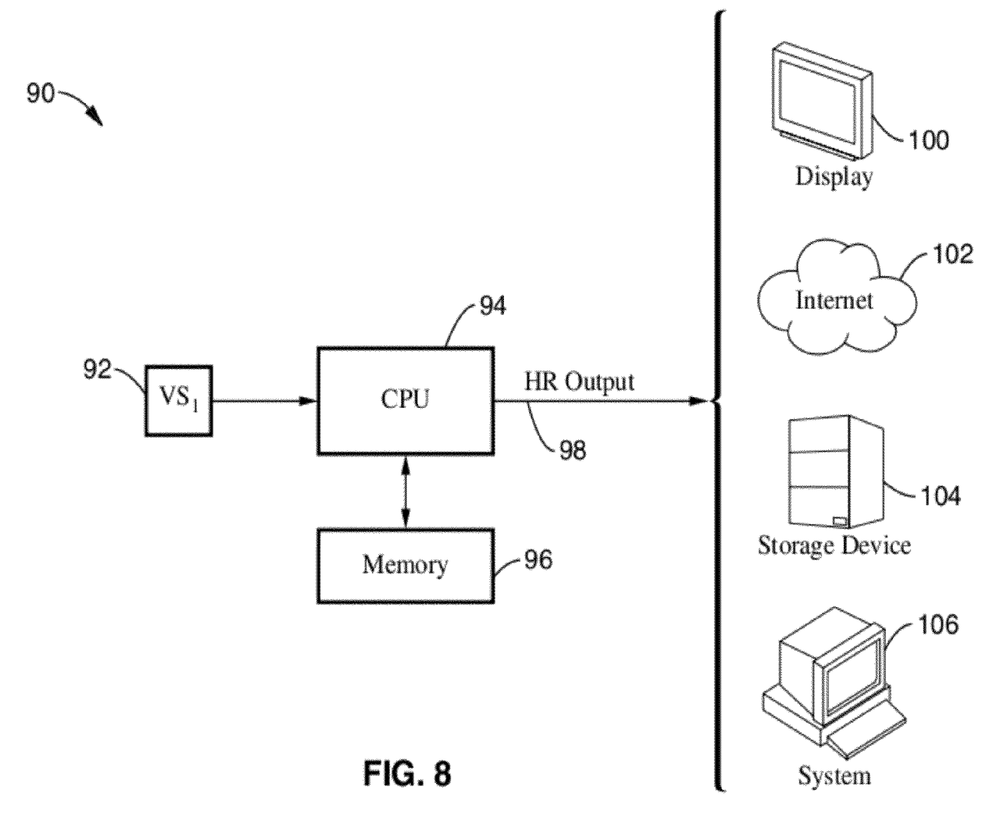
FIG. 8 is a block diagram of a system configured for generating high spatial resolution output according to an embodiment of the present invention.

FIG. 8 illustrates an example embodiment 90 of an imaging system configured for generating enhanced super-resolution (spatial resolution) output according to the present invention. Output from an image source 92 is shown received by at least one computer 94 (e.g., CPU, microprocessor, DSP, ASIC containing a processor core, and so forth) which has access to at least one memory 96 from which instructions are executed for performing the method according to the present invention and generating enhanced super-resolution output 98.

It should be appreciated that memory 96 can comprise any desired form of memory and combination thereof, into which executable instructions may be received for processing by computer 94, such as internal semiconductor memory (e.g., SRAM, DRAM, FLASH, ROM, and so forth), as well as receiving information from external memory sources including semiconductor memories and media devices.

The enhanced super-resolution output can be utilized in a similar manner as any conventional high-resolution image output, shown by way of example are a display 100, a communication path 102 (e.g., communicating over a network such as the Internet), stored in a storage device 104 (e.g., for later use), received for use by another system or systems 106, and/or utilized in other ways in a manner similar to that of any conventional high-resolution video output.

It should be appreciated, that the present invention may be applied to a number of different applications. In general, any application in which super-resolution techniques are applicable for increasing spatial image resolution. Examples include camera systems (e.g., still and video), systems which incorporate cameras, or which process image/video data from camera, and systems configured for processing image/video data which has been stored or which has been received or retrieved from another system.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of generating super-resolution imaging, comprising:
    estimating motion $MV_{i+1}$ for a super-resolution image $SR_i$ as a reference and a low-resolution image $LR_{i+1}$ at a current temporal position within a series of images i=0, 1, ... N;
    generating a motion compensated image on said super-resolution image $SR_i$ and constructing an initial super-resolution image initial $SR_{i+1}$;
    generating a control parameter $\beta$ in response to motion compensation of an initial $SR_i$ input in response to input of a low-resolution image $LR_i$ to create recursive high-frequency component feedback;
    generating a control parameter $\alpha$ in response to interpretation of previous estimated high-frequency components $\Delta SR_{i-1}$ and motion estimation $MV_i$;
    adaptively adjusting the $\alpha$ value in response to motion accuracy; and
    summing control parameters $\alpha$ and $\beta$ to output an estimated high-frequency component $\Delta SR_i$.

2. A method as recited in claim 1, wherein constructing a super-resolution image of initial $SR_{i+1}$ comprises:
    generating a motion mask $mask_{i+1}$ in response to comparing the motion-compensated image $SR_i$ and up-scaled version of image $LR_{i+1}$;
    said motion mask indicating reliability of each pixel within motion-compensated image $SR_i$; and
    selecting, in response to motion mask $mask_{i+1}$, either pixels of motion-compensated image $SR_i$, pixels of the up-scaled version of image $LR_{i+1}$, or the combination of motion-compensated image $SR_i$ and pixels of the up-scaled version of image $LR_{i+1}$, to construct an initial super-resolution picture initial $SR_{i+1}$.

3. A method as recited in claim 1, wherein generating of said control parameter $\beta$ further comprises:
    generating feedback in response to comparing low-resolution picture $LR_i$ with Initial $SR_i$;
    extracting high frequencies from said feedback and in response to 2D priori filtering of Initial $SR_i$ to generate an intermediate control parameter $\beta$ signal; and
    masking of the output of said intermediate control parameter $\beta$ signal based on input $mask_i$ to generate resultant said control parameter $\beta$.

4. A method as recited in claim 1, wherein generating of said control parameter $\alpha$ further comprises masking of the output of said motion compensation based on input $mask_i$ to generate said control parameter $\alpha$.

5. A method as recited in claim 1, wherein said method enhances the quality of super-resolution video by suppressing ringing artifacts, reducing high-frequency noise, reducing blocking artifacts, and smoothing out the jagged edges of images.

6. A method as recited in claim 1, wherein said adaptively adjusting the $\alpha$ value in response to motion accuracy comprises:
    constraining the value of $\alpha$ between $0 \leq \alpha < 1$;
    selecting a first $\alpha$ value for areas within which accurate motion information is available, toward achieving reduced ringing and improved noise suppression;
    selecting a second $\alpha$ value, lower than said first $\alpha$ value, for areas having less accurate motion information, to hold the output closer to the original to provide suppression of artifacts; and
    setting said $\alpha$ value towards zero for areas having suspicious or no motion information, to reduce the introduction of artifacts.

7. A method as recited in claim 6, wherein said first value is approximately 0.75 ($\alpha \approx 0.75$).

8. A method as recited in claim 6, wherein said second value is approximately 0.25 ($\alpha \approx 0.25$).

9. A method of generating super-resolution imaging, comprising:
   estimating motion $MV_{i+1}$ for a super-resolution image $SR_i$ as a reference and a low-resolution image $LR_{i+1}$ at a current temporal position within a series of images i=0, 1, . . . N;
   generating a motion compensated image on said super-resolution image $SR_i$;
   constructing an initial super-resolution image as initial $SR_{i+1}$ by,
      generating a motion mask $mask_{i+1}$ in response to comparing the motion-compensated image $SR_i$ and up-scaled version of image $LR_{i+1}$, wherein said motion mask indicates reliability of each pixel within motion-compensated image $SR_i$,
      selecting, in response to motion mask $mask_{i+1}$, either pixels of motion-compensated image $SR_i$, pixels of the up-scaled version of image $LR_{i+1}$, or the combination of motion-compensated image $SR_i$ and pixels of the up-scaled version of image $LR_{i+1}$, to construct an initial super-resolution picture initial $SR_{i+1}$;
   generating a control parameter $\beta$ in response to motion compensation of an initial $SR_i$ input in response to input of a low-resolution image $LR_i$ to create recursive high-frequency component feedback;
   generating a control parameter $\alpha$ in response to interpretation of previous estimated high-frequency components $\Delta SR_{i-1}$ and motion estimation $MV_i$;
   adaptively adjusting the $\alpha$ value in response to motion accuracy; and
   summing control parameter $\alpha$ and $\beta$ to produce an estimated high-frequency component $\Delta SR_i$.

10. A method as recited in claim 9, wherein generating of said control parameter $\beta$ further comprises:
   generating feedback in response to comparing low-resolution picture $LR_i$ with initial $SR_i$;
   extracting high frequencies from said feedback and in response to filtering of Initial $SR_i$ to generate an intermediate control parameter $\beta$ signal; and
   masking of the output of said intermediate control parameter $\beta$ signal based on input $mask_i$ to generate a resultant of said control parameter $\beta$.

11. A method as recited in claim 9, wherein generating of said control parameter $\alpha$ further comprises masking of the output of said motion compensation based on input $mask_i$ to generate a resultant of said control parameter $\alpha$.

12. A method as recited in claim 9, wherein said method enhances the quality of super-resolution video by suppressing ringing artifacts, reducing high-frequency noise, reducing blocking artifacts, and smoothing out the jagged edges of images.

13. A method as recited in claim 9, wherein said adaptively adjusting the $\alpha$ value in response to motion accuracy comprises:
   constraining the value of $\alpha$ between $0 \leq \alpha < 1$;
   selecting a first $\alpha$ value which for areas with accurate motion information, toward achieving improved ringing and noise suppression; and
   selecting a second $\alpha$ value, lower than said first $\alpha$ value, for areas having less accurate motion information, to hold the output closer to the original to provide suppression of artifacts; and
   setting $\alpha$ value towards zero for areas having suspicious or no motion information, to reduce the introduction of artifacts.

14. A method as recited in claim 9, wherein said first value is approximately 0.75 ($\alpha \approx 0.75$).

15. A method as recited in claim 9, wherein said second value is approximately 0.25 ($\alpha \approx 0.25$).

16. An apparatus for generating super-resolution imaging, comprising:
   a computer configured for processing sequences of images; and
   programming executable on said computer for,
      estimating motion $MV_{i+1}$ for a super-resolution image $SR_i$ as a reference and a low-resolution image $LR_{i+1}$ at a current temporal position within a series of images i=0, 1, . . . N,
      generating a motion compensated image on said super-resolution image $SR_i$ and constructing an initial super-resolution image as initial $SR_{i+1}$,
      generating a control parameter $\beta$ in response to motion compensation of an initial $SR_i$ input in response to input of a low-resolution image $LR_i$ to create recursive high-frequency component feedback,
      generating a control parameter $\alpha$ in response to interpretation of previous estimated high-frequency components $\Delta SR_{i-1}$ and motion estimation $MV_i$,
      adaptively adjusting the $\alpha$ value in response to motion accuracy, and
      summing control parameters $\alpha$ and $\beta$ to output an estimated high-frequency component $\Delta SR_i$.

17. An apparatus as recited in claim 16, wherein constructing a super-resolution image of initial $SR_{i+1}$ comprises:
   generating a motion mask $mask_{i+1}$ in response to comparing the motion-compensated image $SR_i$ and up-scaled version of image $LR_{i+1}$, with said motion mask indicating reliability of each pixel within motion-compensated image $SR_i$; and
   selecting, in response to motion mask $mask_{i+1}$, either pixels of motion-compensated image $SR_i$, pixels of the up-scaled version of image $LR_{i+1}$, or the combination of motion-compensated image $SR_i$ and pixels of the up-scaled version of image $LR_{i+1}$, to construct an initial super-resolution picture initial $SR_{i+1}$.

18. An apparatus as recited in claim 16, wherein generating of said control parameter $\beta$ further comprises:
   generating feedback in response to comparing low-resolution picture $LR_i$ with initial $SR_i$;
   extracting high frequencies from said feedback and in response to 2D priori filtering of initial $SR_i$ to generate an intermediate control parameter $\beta$ signal; and
   masking of the output of said intermediate control parameter $\beta$ signal based on input $mask_i$ to generate said control parameter $\beta$.

19. An apparatus as recited in claim 16, wherein said adaptively adjusting the $\alpha$ value in response to motion accuracy comprises:
   constraining the value of control parameter $\alpha$ between $0 \leq \alpha < 1$;
   selecting a first $\alpha$ value which for areas with accurate motion information, toward achieving improved ringing and noise suppression;
   selecting a second $\alpha$ value, lower than said first $\alpha$ value, for areas having less accurate motion information, to hold the output closer to the original to provide suppressing artifacts; and setting α value towards zero for areas having suspicious or no motion information, to reduce the introduction of artifacts.

20. A non-transitory computer-readable media containing a computer program executable on a computer configured for processing video images and causing the computer to generate a shutter-time compensated high spatial resolution video image output, in response to steps, comprising:

estimating motion $MV_{i+1}$ for a super-resolution image $SR_i$ as a reference and a low-resolution image $LR_{i+1}$ at a current temporal position within a series of images i=0, 1, ... N;

generating a motion compensated image on said super-resolution image $SR_i$ and constructing an initial super-resolution image initial $SR_{i+1}$;

generating a control parameter β in response to motion compensation of an initial $SR_i$ input in response to input of a low-resolution image $LR_i$ to create recursive high-frequency component feedback;

generating a control parameter α in response to interpretation of previous estimated high-frequency components $\Delta SR_{i-1}$ and motion estimation $MV_i$;

adaptively adjusting the α value in response to motion accuracy; and summing control parameters α and β to output an estimated high-frequency component $\Delta SR_i$.

* * * * *